(12) United States Patent
Wang et al.

(10) Patent No.: US 10,706,567 B2
(45) Date of Patent: Jul. 7, 2020

(54) DATA PROCESSING METHOD, APPARATUS, SYSTEM AND STORAGE MEDIA

(71) Applicant: Alibaba Group Holding Limited, Grand Cayman (KY)

(72) Inventors: Bin Wang, Hangzhou (CN); Jingming Yu, Beijing (CN); Xiaoduan Feng, Hangzhou (CN); Pan Pan, Beijing (CN); Rong Jin, Sammamish, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/165,888

(22) Filed: Oct. 19, 2018

(65) Prior Publication Data
US 2019/0122375 A1 Apr. 25, 2019

(30) Foreign Application Priority Data

Oct. 20, 2017 (CN) .......................... 2017 1 0984833

(51) Int. Cl.
*G06T 17/00* (2006.01)
*G06T 7/33* (2017.01)
*G06K 9/62* (2006.01)
*G06T 19/20* (2011.01)
(Continued)

(52) U.S. Cl.
CPC .............. *G06T 7/33* (2017.01); *G06K 9/6211* (2013.01); *G06T 17/00* (2013.01); *G06T 19/00* (2013.01); *G06T 19/20* (2013.01); *G06K 9/4604* (2013.01); *G06K 9/4652* (2013.01); *G06T 2207/10028* (2013.01); *G06T 2207/20221* (2013.01); *G06T 2210/56* (2013.01); *G06T 2219/2004* (2013.01)

(58) Field of Classification Search
None
See application file for complete search history.

(56) References Cited

U.S. PATENT DOCUMENTS

| 2012/0075342 A1 | 3/2012 | Choubassi et al. |
| 2012/0256916 A1 | 10/2012 | Kitamura et al. |
| 2013/0181983 A1 | 7/2013 | Kitamura et al. |

(Continued)

FOREIGN PATENT DOCUMENTS

CN 106033621 A 10/2016

OTHER PUBLICATIONS

The PCT Search Report and Written Opinion dated Jan. 18, 2019, for PCT Application No. PCT/US2018/056779, 18 pages.

*Primary Examiner* — Nicholas R Wilson
(74) *Attorney, Agent, or Firm* — Lee & Hayes, P.C.

(57) ABSTRACT

A data processing method includes determining feature points in first point cloud data and feature points in second point cloud data, the first point cloud data and the second point cloud data being used for representing different parts of a same object; performing feature matching between the first point cloud data and the second point cloud data to determine feature points satisfying feature matching condition(s) between the first point cloud data and the second point cloud data, and form a plurality of feature point pairs; determining a transformation matrix in which spatial distances between feature points in one or more feature point pairs of the plurality of feature point pairs conform to a proximity condition; and performing coordinate transformation on the one or more feature point pairs using the transformation matrix to register the first point cloud data with the second point cloud data.

17 Claims, 12 Drawing Sheets

(51) Int. Cl.
*G06T 19/00* (2011.01)
*G06K 9/46* (2006.01)

(56) References Cited

U.S. PATENT DOCUMENTS

| | | |
|---|---|---|
| 2014/0016857 A1 | 1/2014 | Richards |
| 2014/0037194 A1 | 2/2014 | Kitamura et al. |
| 2015/0015602 A1 | 1/2015 | Beaudoin |
| 2017/0046840 A1 | 2/2017 | Chen et al. |

DATA PROCESSING METHOD, APPARATUS, SYSTEM AND STORAGE MEDIA

CROSS REFERENCE TO RELATED PATENT APPLICATIONS

This application claims priority to Chinese Patent Application No. 201710984833.X, filed on 20 Oct. 2017, entitled "Data Processing Method, Apparatus, System and Storage Media," which are hereby incorporated by reference in its entirety.

TECHNICAL FIELD

The present disclosure relates to the technical field of computers, and particularly to data processing methods, apparatuses, systems, and storage media.

BACKGROUND

Whether in the field of Virtual Reality (VR) or Augmented Reality (AR), using a three-dimensional (Three Dimensional, 3D) single-view point cloud for registering and forming a complete 3D model is a key operation of 3D presentation. A collection of point data of an outer surface of an object is called a point cloud. Since a 3D single-view point cloud can only feedback three-dimensional object information in this view, multiple 3D single-view point clouds need to be registered, which is called a point cloud registration, if three-dimensional information of a full or full-view object needs to be obtained.

Registration through surface features of objects is often limited by the accuracy of feature matching, and is heavily affected by noise, thus having a poor stability.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present disclosure provide a method, an apparatus, a system, and a storage media for data processing, which can improve the accuracy and stability of registration of surface features of an object.

According to the embodiments of the present disclosure, a data processing method is provided, which includes determining feature points in first point cloud data and feature points in second point cloud data, the first point cloud data and the second point cloud data being used for representing different parts of a same object; performing feature matching between the first point cloud data and the second point cloud data to determine feature points that satisfy feature matching condition(s) between the first point cloud data and the second point cloud data, and form a plurality of feature point pairs; for one or more feature point pairs of the plurality of feature point pairs, determining a transformation matrix in which spatial distances between feature points in the feature point pairs conform to a proximity condition; and performing coordinate transformation on the one or more feature point pairs of the plurality of feature point pairs using the transformation matrix to register the first point cloud data with the second point cloud data.

According to the embodiments of the present disclosure, a data processing apparatus is provided, which includes a feature acquisition module used for determining feature points in first point cloud data and feature points in second point cloud data, the first point cloud data and the second point cloud data being used for representing different parts of a same object; a feature matching module used for performing feature matching between the first point cloud data and the second point cloud data to determine feature points that satisfy feature matching condition(s) between the first point cloud data and the second point cloud data, and form a plurality of feature point pairs; a feature point pair selection module used for determining a transformation matrix in which spatial distances between feature points in one or more feature point pairs of the plurality of feature point pairs conform to a proximity condition for the feature point pairs; and a data registration module used for performing coordinate transformation on the one or more feature point pairs of the plurality of feature point pairs using the transformation matrix to register the first point cloud data with the second point cloud data.

According to the embodiments of the present disclosure, a data processing system includes memory and processor(s), the memory being configured to store a program, and the processor(s) being configured to read executable program codes stored in the memory to execute the data processing method as described above.

According to the embodiments of the present disclosure, a computer readable storage media is provided. The computer readable storage media stores instructions, the instructions, when run on a computer, causing the computer to execute the data processing method of the above aspects.

According to the data processing method, apparatus, system and storage media in the embodiments of the present disclosure, the accuracy and the stability of registration of surface features of an object can be improved.

BRIEF DESCRIPTION OF THE DRAWINGS

In order to describe technical solutions of the embodiments of the present disclosure more clearly, accompanying drawings that are needed by the embodiments of the present disclosure are briefly described herein. Based on these accompanying drawings, one of ordinary skill in the art can obtain other drawings without making any creative effort.

DETAILED DESCRIPTION

Figure 1A:
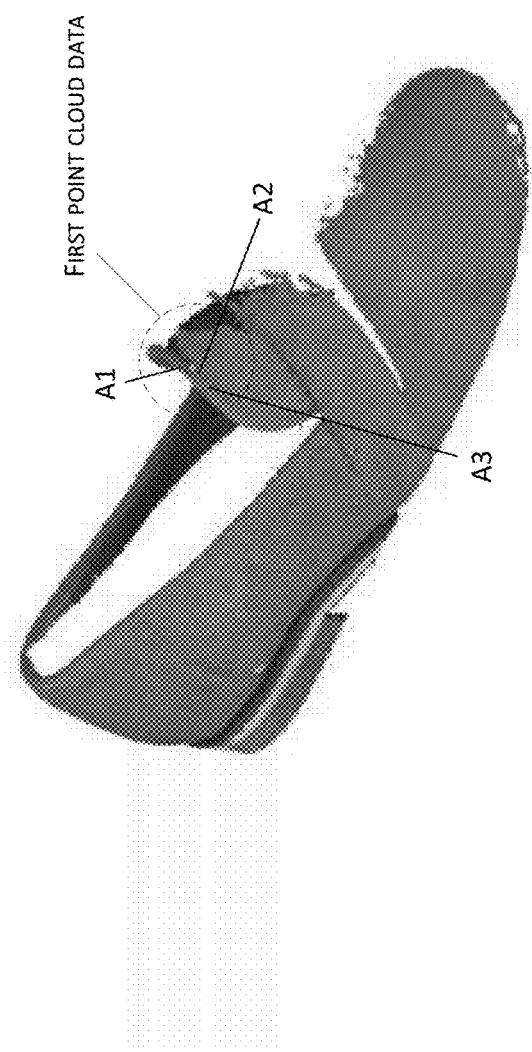
FIG. 1A is a first patch model that is to be processed and corresponds to an object corresponding to a first photographing angle of view in accordance with the embodiments of the present disclosure.

Features and illustrative embodiments of the present disclosure will be described in detail hereinafter. In order to make the goals, the technical solutions and the advantages of the present disclosure more understandable, the present disclosure will be described in further detail hereinafter with reference to the accompanying drawings and the embodiments. It should be understood that specific embodiments described herein are construed as only illustrating and not limiting the present disclosure. For one skilled in the art, the present disclosure may be implemented without the need of some of these specific details. The following description of the embodiments is merely used for providing a better understanding of the present disclosure through examples of the present disclosure.

It should be noted that relational terms such as first and second, etc. in the present context are used merely to distinguish one entity or operation from another entity or operation, and do not necessarily require or imply any type of such relationship or order between these entities or operations in practice. Furthermore, terms "including", "containing", or any other variants thereof are intended to encompass a non-exclusive inclusion, such that a process, method, article, or device including a series of elements includes not only those elements but also other elements that are not explicitly listed, or elements that are inherent to such process, method, article, or device. Without any further limitation, an element that is defined by a phrase "including" does not exclude the presence of additional elements in a process, method, article, or device that includes the element.

In implementations, AR technology can capture real-world video images and video through a photographing terminal carried by a system, and use technologies such as image registration to estimate a three-dimensional posture of a virtual object in the video images and video, thereby placing the virtual object or scene in a predetermined position in the real environment, and finally rendering the scene from the perspective of a camera lens.

In implementations, the VR technology is a computer simulation system in which a virtual world can be created and experienced. Essentially, the system uses a computer to generate a simulated environment. The simulated environment includes an interactive three-dimensional dynamic view of multi-source information fusion and a system simulation of behavior of physical entities, thus being able to achieve an immersive experience.

In the foregoing embodiments, when augmented reality technology and virtual reality technology need to use a three-dimensional scene, the following operations may be included.

First, point cloud data of an object is obtained.

In implementations, an instrumentation device capable of performing three-dimensional scanning, such as a three-dimensional scanner, a laser or a radar scanner, a stereo camera, or the like, may be used to project a structured light on an object in a real scene to obtain a plurality of pieces of point data of the object in a real scene by performing three-dimensional scanning from multiple viewing angles, for example, 360 degrees. These pieces of point data constitute point cloud data corresponding to different viewing angles.

Second, point cloud registration is performed according to the point cloud data corresponding to the different viewing angles of the object.

As an example, three-dimensional scanning can be performed on the object with different shooting angles in a camera coordinate system. Point cloud data of different shooting angles sometimes appears as a rotation misalignment or a translation misalignment. Therefore, in order to obtain complete point cloud data, multiple point clouds need to be registered.

In the following description of the embodiments of the present disclosure, when an object is three-dimensionally scanned, a plurality of pieces of point cloud data measured at different shooting angles for the object that is rotated or translated. The plurality of pieces of point cloud data may be regarded as having different viewing angles or in different coordinate systems.

Therefore, in implementations, the point cloud registration can be understood as performing an operation of a unified coordinate system on the point cloud data, and performing coordinate transformation for the point cloud data of the object captured at different viewing angles or in different coordinate systems through a rotation operation and/or a translation operation, to achieve a consistent alignment of the point cloud data in the unified coordinate system and to form a complete three-dimensional point cloud data model.

In implementations, coordinate transformation between pieces of point cloud data can be performed through a transformation matrix T.

As an example, the transformation matrix can be expressed as T=[R t], where R is a rotation component, and can be represented as a 3×3 matrix, representing a rotation relationship between two pieces of point cloud data at different viewing angles. t is a translation component, and can be expressed as a 1×3 matrix, representing a translation relationship between two pieces of point cloud data at different viewing angles. Coordinates of pieces point cloud data corresponding to different viewing angles are transformed into a unified coordinate system through and according to this transformation matrix T.

In the foregoing process of point cloud data registration, a surface reconstruction method of a three-dimensional reconstruction technology can be used to obtain a polygonal patch model of obtained first point cloud data of the object according to the first point cloud data. The polygonal patch model includes a plurality of polygonal patches, each of which can uniquely define a polygonal plane.

In implementations, point cloud data of a same object at different viewing angles or in different coordinate systems may be registered. Specifically, a polygonal patch model corresponding to each point cloud model obtained by three-dimensional reconstruction may be used as a patch to be processed. Point data in each of the patches to be processed at different viewing angles or in different coordinate systems may be transformed into a unified coordinate system using a transformation matrix, to obtain a complete 3D point cloud data model of the object.

In order to better understand the present disclosure, a shoe is taken as an example of a specific object. Polygonal patch models of the object at different viewing angles are obtained by using point cloud models at different viewing angles, and the polygonal patch models are treated as patch models to be processed for description of a data processing method according to the embodiments of the present disclosure. It should be understood that such description should not be construed as limiting the possibilities of the scope or implementations of the present disclosure. A data processing method for a specific object other than shoes is consistent with specific implementations of the data processing method described in connection with FIGS. 1A-1E.

Figure 1B:
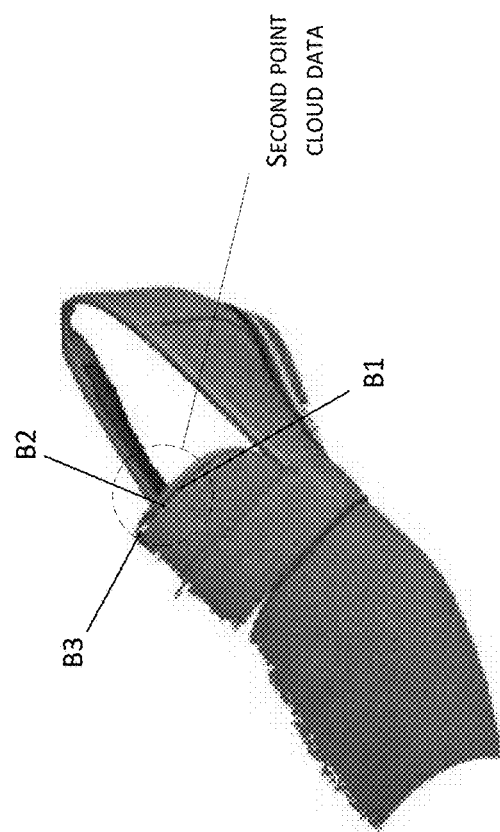
FIG. 1B is a second patch model that is to be processed and corresponds to an object corresponding to a second photographing angle of view in accordance with the embodiments of the present disclosure.
Figure 1C:
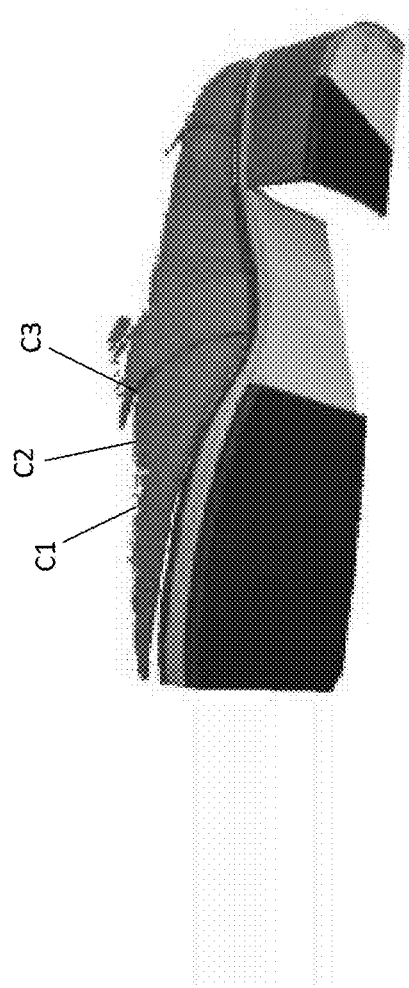
FIG. 1C is a third patch model that is to be processed and corresponds to an object corresponding to a third photographing angle of view in accordance with the embodiments of the present disclosure.
Figure 1D:
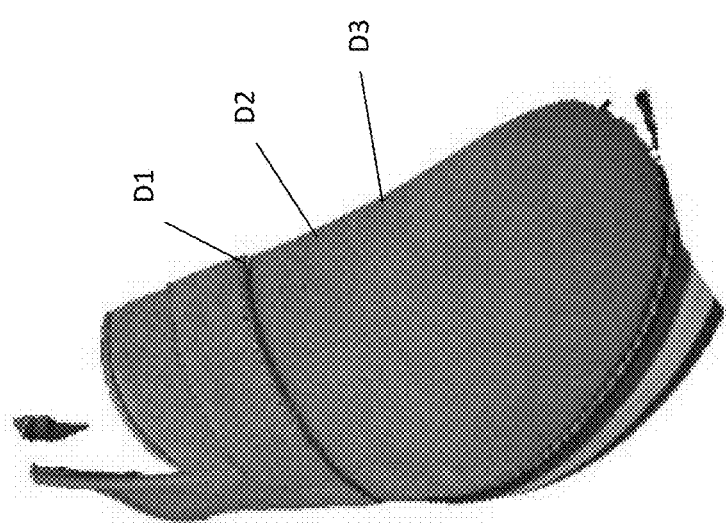
FIG. 1D is a fourth patch model that is to be processed and corresponds to an object corresponding to a fourth photographing angle of view in accordance with the embodiments of the present disclosure.
Figure 1E:
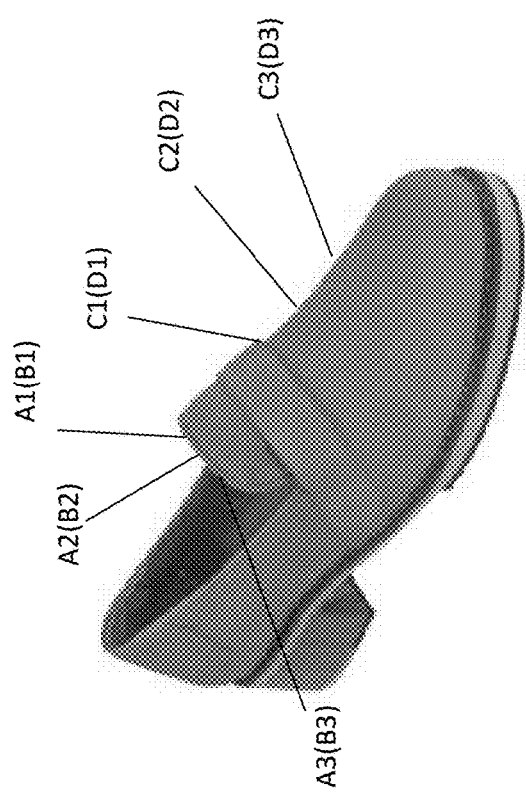
FIG. 1E is a schematic diagram showing an effect of a three-dimensional point cloud data model obtained by a data processing method in accordance with the embodiments of the present disclosure.

FIG. 1A is a first patch model 102 that is to be processed and corresponds to an object corresponding to a first photographing angle of view in accordance with the embodiments of the present disclosure. FIG. 1B is a second patch model 104 that is to be processed and corresponds to an object corresponding to a second photographing angle of view in accordance with the embodiments of the present disclosure. FIG. 1C is a third patch model 106 that is to be processed and corresponds to an object corresponding to a third photographing angle of view in accordance with the embodiments of the present disclosure. FIG. 1D is a fourth patch model 108 that is to be processed and corresponds to an object corresponding to a fourth photographing angle of view in accordance with the embodiments of the present disclosure. FIG. 1E is a schematic diagram showing an effect of a three-dimensional point cloud data model 110 obtained by a data processing method in accordance with the embodiments of the present disclosure.

In FIG. 1A to FIG. 1D, the first patch model to be processed is a reconstruction result of a plurality of pieces of first point cloud data obtained by a three-dimensional reconstruction technology at a first viewing angle. The second patch model to be processed is a reconstruction result of a plurality of pieces of second point cloud data obtained by the three-dimensional reconstruction technology at a second viewing angle. The third patch model to be processed is a reconstruction result of a plurality of pieces of third point cloud data obtained by the three-dimensional reconstruction technology at a third viewing angle. The fourth patch model to be processed is a reconstruction result of a plurality of pieces of fourth point cloud data obtained by the three-dimensional reconstruction technology at a fourth viewing angle. A process of the data processing method can be described in detail and illustrative effects can be demonstrated in conjunction with FIGS. 1A-1E.

In the following description, a patch model to be processed can be simply referred to as a patch to be processed.

In implementations, two patches to be processed may be selected from patches of an object to be processed, such as the first patch to be processed shown in FIG. 1A and the second patch to be processed shown in FIG. 1B to perform the data processing method 100 of the embodiments of the present disclosure.

Figure 1F:
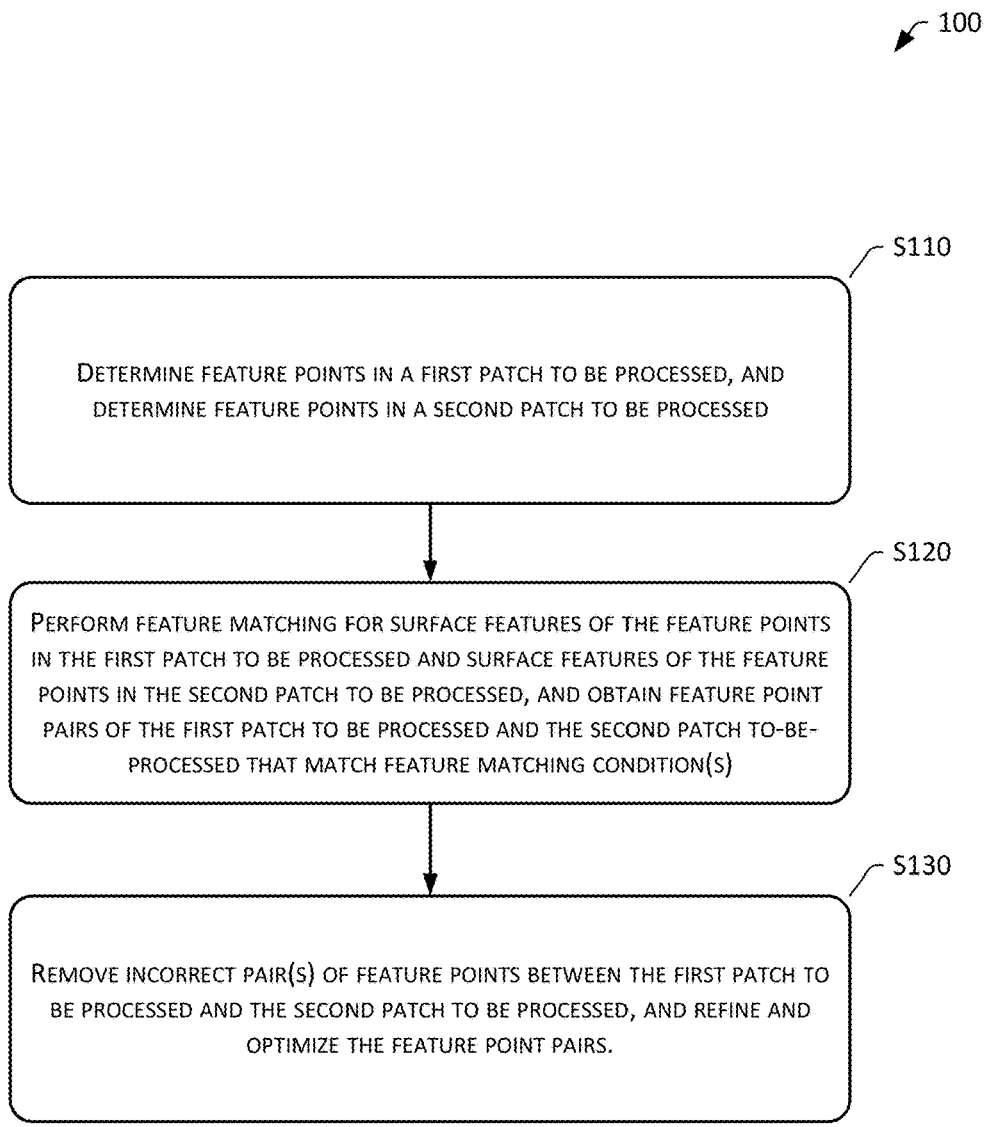
FIG. 1F is a flowchart showing a data processing method in accordance with the embodiments of the present disclosure.
Figure 2A:
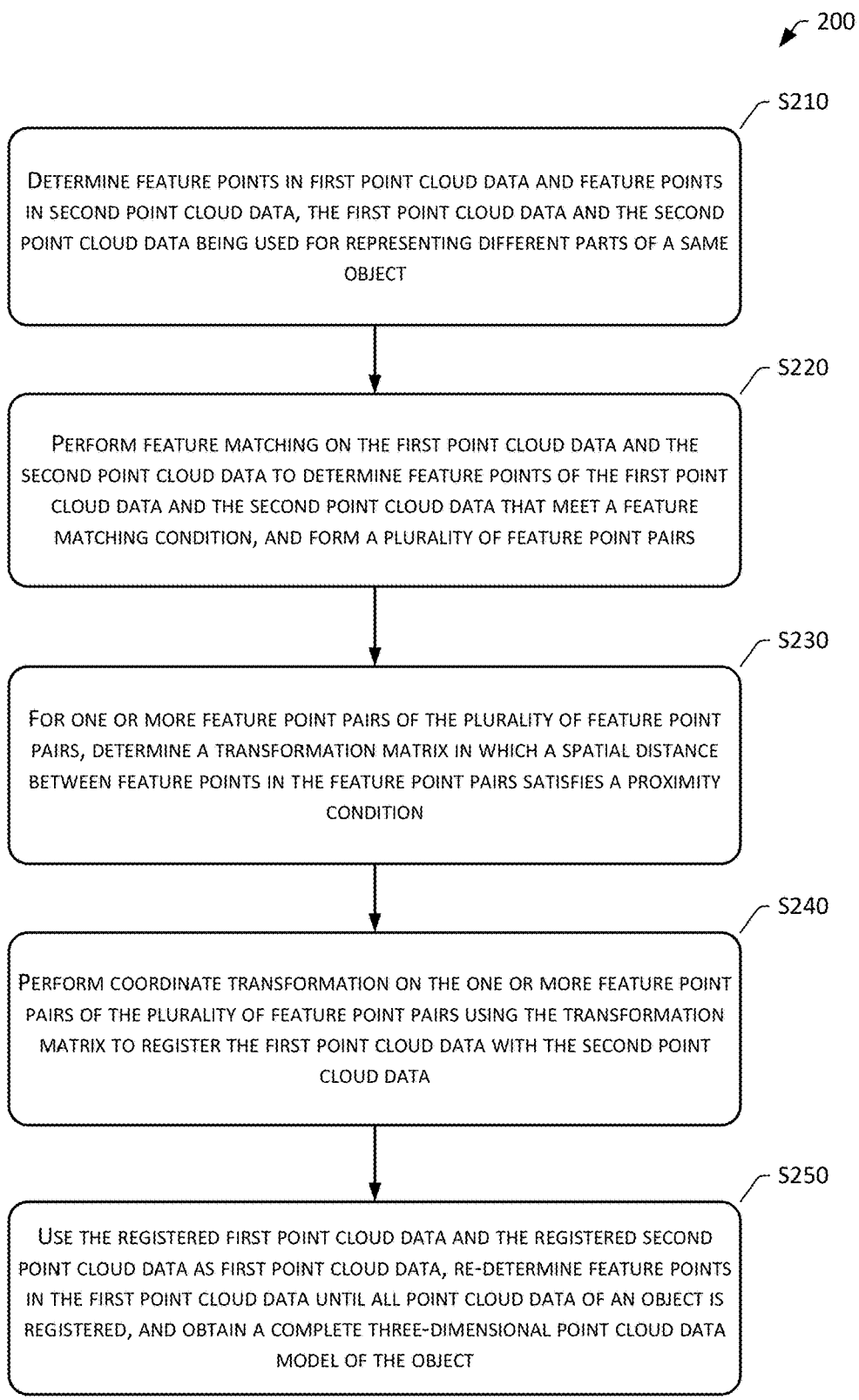
FIG. 2A-FIG. 2D are flowcharts showing a data processing method in accordance with the embodiments of the present disclosure.
Figure 2B:
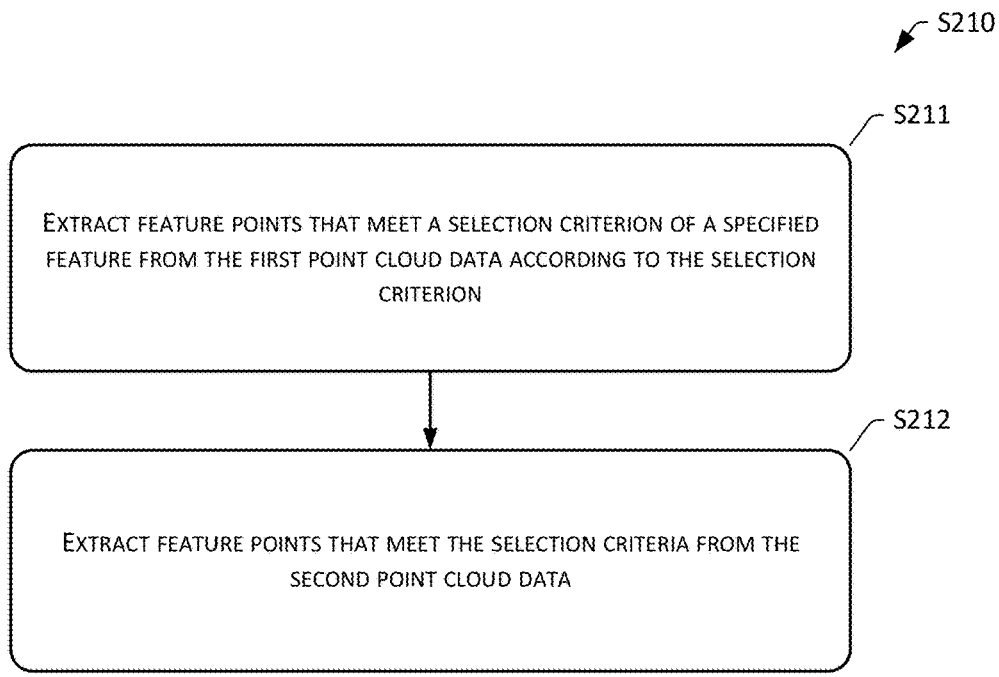
Figure 2C:
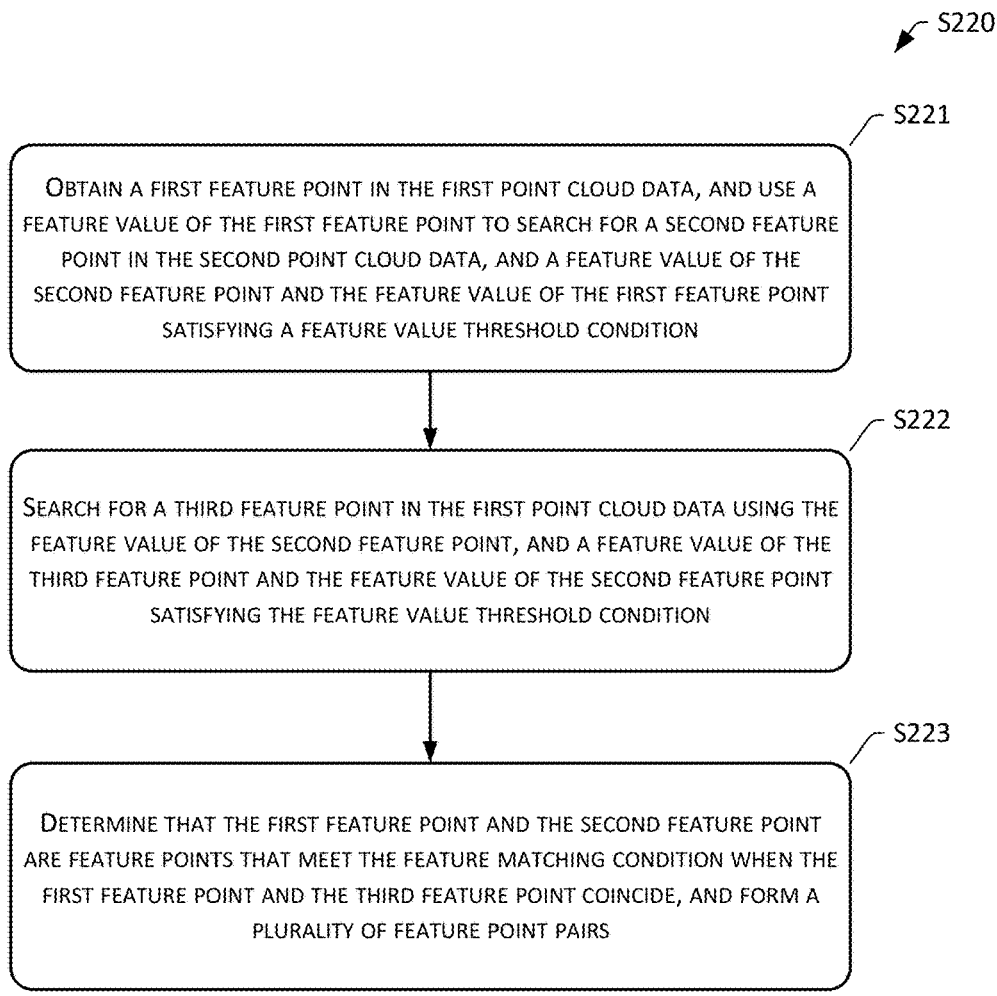
Figure 2D:
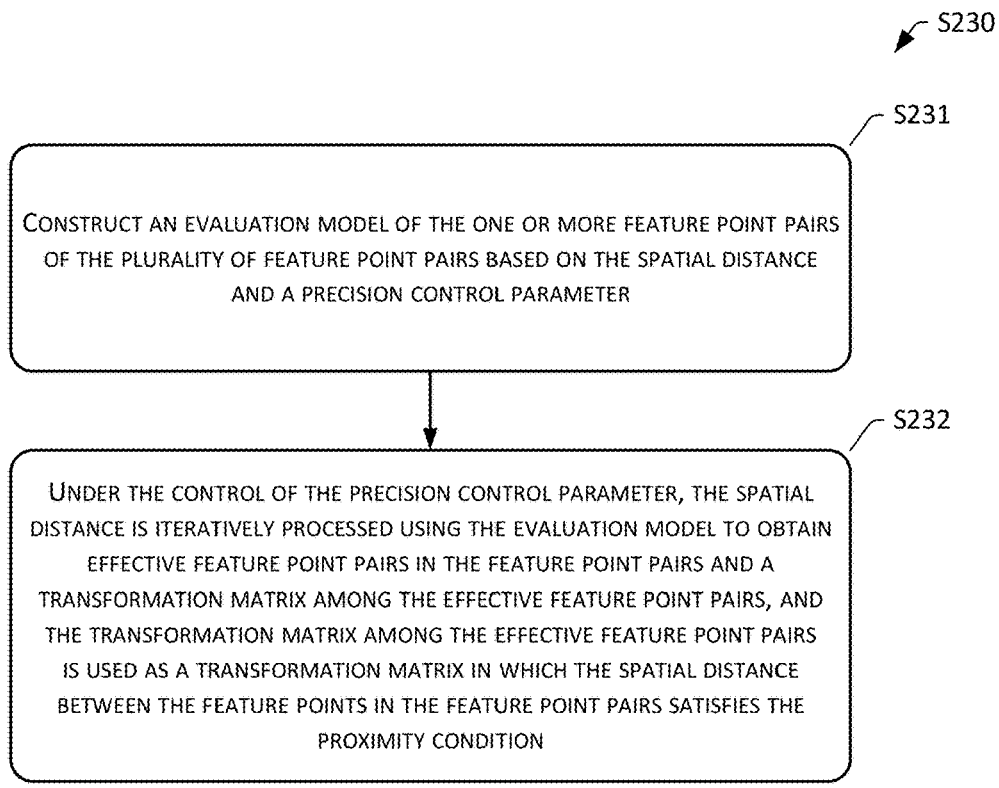

In implementations, the data processing method 100 may include the following operations as shown in FIG. 1F.

Operation S110: Determine feature points in a first patch to be processed, and determine feature points in a second patch to be processed.

In implementations, first, object surface feature extraction may be performed on the first patch to be processed, and the object surface feature extraction may be performed on the second patch to be processed. Feature points in the first patch to be processed can be determined through extracted surface features of the first patch to be processed. Feature points in the second patch to be processed can be determined based on extracted surface features of the second patch to be processed.

In implementations, point cloud data in each patch to be processed can be understood as a set of points of surface features of an object. By analyzing the point cloud data, the surface features of the object can be obtained.

In particular, the surface features may include geometric features and texture features. A geometric feature may include at least a normal vector or curvature of a sampling point on a surface of the object, and a texture feature may at least include the brightness or gray level of the sampling point on the surface of the object.

As an example, feature points in the first patch to be processed may be extracted using normal vectors of sampling points in the first patch to be processed.

In this example, a degree of change in normal vectors of sampling points of a patch to be processed can be used to measure fluctuation or smoothness of the patch to be processed. The greater the degree of change in the normal vectors of the sampling points is, the larger the fluctuation of an area where the points are located.

In implementations, a sampling point in the first patch to be processed is obtained. A normal vectors of the sampling point in the first patch to be processed is calculated. A gradient of the normal vector of the sampling point in the first patch to be processed is calculated. The gradient of the normal vector can be used to indicate a direction of change of the normal vector of the current sampling point. A value of the gradient of the normal vector can be used to measure a rate of change of the normal vector of the current sampling point. When the gradient of the normal vector of the sampling point reaches an extreme value, this indicates that an abrupt change in the normal vector of the first patch to be processed occurs at the current sampling point, and the sampling point can be used as a feature point in the first patch to be processed.

As another example, feature points in the first patch to be processed may be extracted using curvatures of sampling points of the first patch to be processed.

In this example, a degree of change in the curvature of a sampling point of a patch to be processed can be used to measure a degree of curvature of a curved surface of the patch to be processed. The greater the degree of change in the curvature is, the greater the degree of curvature of the surface is, i.e., the lower the degree of smoothness of the surface is.

In implementations, a sampling point in the first patch to be processed is obtained. A curvature value of the sampling point in the first patch to be processed is calculated. A gradient of the curvature of the sampling point in the first patch to be processed is calculated. The gradient of the curvature may be used to indicate a direction of change of the curvature of the current sampling point, and a value of the gradient of the curvature can be used to measure a rate of change of the curvature of the current sampling point. When the gradient of the curvature of the sampling point takes an extreme value, this indicates that an abrupt change in the curvature of the first patch to be processed occurs at the current sampling point. This sampling point can be used as a feature point in the first patch to be processed.

In implementations, feature points in the first patch to be processed may be determined through texture features of the first patch to be processed that are extracted.

As an example, the feature points in the first patch to be processed may be extracted using a degree of change in brightness of sampling points of the first patch to be processed.

In implementations, a sampling point in the first patch to be processed can be obtained. A luminance value of the sampling point in the first patch to be processed is calculated. A gradient of the luminance value of the sampling point in the first patch to be processed is calculated. The gradient of the luminance value can be used to indicate a direction in which the brightness of the current sampling point changes the fastest. When the gradient of the brightness of the sampling point reaches an extreme value, this indicates that an abrupt change in the brightness of the first patch to be processed occurs at the current sampling point, and the sampling point can be used as a feature point in the first patch to be processed.

As an example, feature points in the first patch to be processed may be extracted using degrees of change of grayscale of sampling points of the first patch to be processed. A process thereof is basically similar to the principles and procedure of extracting feature points in the first patch to be processed through degrees of change in the brightness of sampling points of the first patch to be processed, and are not repeatedly described herein.

Through operation S110, feature points in the first patch to be processed, such as a feature point A1, a feature point A2, and a feature point A3 as shown in FIG. 1A, can be obtained.

Using the above procedure of extracting feature points of the embodiments, an operation of extracting feature points of the second patch to be processed in FIG. 1B is performed to obtain feature points in the second patch to be processed, such as a feature point B1, a feature point B2, and a feature point B3 as shown in FIG. 1B.

Using the above procedure of extracting feature points of the embodiments, an operation of extracting feature points of the third patch to be processed in FIG. 1C is performed to obtain feature points in the third patch to be processed, such as a feature point C1, a feature point C2, and a feature point C3 as shown in FIG. 1C.

Using the above procedure of extracting feature points of the embodiments, an operation of extracting feature points of the fourth patch to be processed in FIG. 1D is performed to obtain feature points in the fourth patch to be processed, such as a feature point D1, a feature point D2, and a feature point D3 as shown in FIG. 1D.

Operation S120: Perform feature matching for surface features of the feature points in the first patch to be processed and surface features of the feature points in the second patch to be processed, and obtain feature point pairs of the first patch to be processed and the second patch to-be-processed that match feature matching condition(s).

In this operation, an object relationship between the feature points of the first patch to be processed and the second patch to be processed is indicated by the feature point pairs.

In implementations, a feature matching condition is a difference between a feature value of a feature point in the first patch to be processed and a feature value of a feature point in the second patch to be processed being the smallest, or the difference being within a preset feature threshold range, according to a same specified feature.

As can be seen from the above embodiments, the specified feature can be a structural feature or a texture feature.

As an example, if the specified feature is curvature, the feature point A1 in the first patch to be processed is considered to be structurally similar to the feature point B1 in the second patch to be processed when a difference between a curvature value of the feature point A1 in the first patch to be processed and a curvature value of the feature point B1 in the second patch to be processed is the smallest, or the difference is within a preset curvature threshold range, as shown in FIGS. 1A and 1B.

As an example, if the specified feature is brightness, the feature point A1 in the first patch to be processed is considered to be texturally similar to the feature point B1 in the second patch to be processed when a difference between a brightness value of the feature point A1 in the first patch to be processed and a brightness value of the feature point B1 in the second patch to be processed is the smallest, or the difference is within a preset brightness threshold range.

As another example, a degree of similarity between the feature point A1 in the first patch to be processed and the feature point B1 in the second patch to be processed may be determined using a combination of more than one specified feature as described above.

In implementations, a curvature and a normal phase vector of a sampling point may be combined to determine whether the feature point A1 in the first patch to be processed and the feature point B1 in the second patch to be processed are structurally similar.

In implementations, the brightness and the grayscale of the sampling point may be combined to determine whether the feature point A1 in the first patch to be processed and the feature point B1 in the second patch to be processed are similar in texture.

In implementations, a structural feature and a texture feature of the sampling point may also be combined to determine whether the feature point A1 in the first patch to be processed and the feature point B1 in the second patch to be processed are structurally and texturally similar.

In implementations, the feature point A1 in the first patch to be processed is obtained, and the feature point B1 in the second patch to be processed is searched from the second patch to be processed using the feature value of the feature point A1. According to the same specified feature, the feature value of the feature point B1 and the feature value of the feature point A1 satisfy the feature matching condition.

In other words, the feature point B1 in the second patch to be processed can be considered to be the best matching point for the feature point A1 in the first patch to be processed. The feature point A1 and the feature point B1 constitute a feature point pair.

In order to obtain a more accurate feature point pair, a matching relationship between the feature point A1 and the feature point B1 may be further verified.

In implementations, the feature point B1 in the second patch to be processed in the above embodiment is obtained, and the feature value of the feature point B1 is used to further search for a feature point A1' in the first patch to be processed (not shown in the figure). A feature value of the feature point A1' and the feature value of the feature point B1 satisfy the feature matching condition of the embodiments of the present disclosure.

In implementations, when the feature point A1 and the feature point A1' in the first patch to be processed overlap, i.e., the feature point A1 and the feature point A1' are the same feature point, the feature point A1 in the first patch to be processed and the feature point B1 in the second patch to be processed are treated as a pair of feature points of the first patch to be processed and the second patch to be processed that satisfy the feature matching condition.

Continuing to reference to FIGS. 1A and 1B, other feature point pairs of the first patch to be processed and the second patch to be processed are obtained through the method in the above embodiments.

As an example, the other feature point pairs may include, for example, the feature point A2 in the first patch to be processed and the feature point B2 in the second patch to be processed, and the feature point A3 and the first patch to be processed and the feature point B3 in the second patch to be processed, etc.

Through the method of finding feature point pairs in the above embodiments, the reliability of the feature point pairs that are obtained can be improved.

Operation S130: Remove incorrect pair(s) of feature points between the first patch to be processed and the second patch to be processed, and refine and optimize the feature point pairs.

In this operation, the feature point pairs obtained at the above operation S120 can be used as initial feature point pairs. Due to the influence of noise, incorrect feature point pairs will inevitably occur in the initial feature point pairs. Not all correspondence relationships between feature points of two patches to be processed represented by the feature point pairs obtained through the above operations are accurate.

Since incorrect feature point pairs will have a negative impact on a result of registration between two patches to be processed, such as reducing the accuracy of registration, causing misalignment of an entire data model, and affecting a visual effect. Therefore, based on operation S120, correspondence relationships between feature points represented by the initial feature point pairs needs to be refined and optimized to remove incorrect feature point pairs from the initial feature point pairs.

In implementations refining and optimizing feature point pairs may include constructing an evaluation model, and calculating a spatial distance of initial registration point pairs in the above embodiments according to the constructed evaluation model.

In implementations, when the spatial distance is calculated to obtain a minimum value, a coordinate transformation matrix corresponding to the minimum value of the spatial distance, and feature point pairs corresponding to the spatial distance in the initial feature point pairs are obtained. The coordinate transformation matrix is regarded as the optimized coordinate transformation matrix T, and the feature point pairs corresponding to the spatial distance is considered to be effective feature point pairs.

In implementations, in order to improve the accuracy and the stability of a calculated coordinate transformation matrix and effective feature point pairs, the evaluation model may include an objective function and a constraint. The constraint may be used to control the accuracy of calculation of a spatial distance. The objective function can be used to reduce the number of incorrect feature point pairs and to suppress the influence of incorrect feature point pairs on the accuracy of registration.

In implementations, the objective function may be a penalty function. The penalty function may be, for example, an error function of a Welsh function, an error function of a Tukey function, or an error function of a Gaman-McClure function. An error function of a Gaman-McClure function is taken as an example hereinafter to introduce a method for refining and optimizing feature point pairs according to the embodiments of the present disclosure.

In implementations, the constraint condition may be a precision control parameter, and the accuracy of calculation of the spatial distance is controlled by the precision control parameter within a value range of the precision control parameter.

In implementations, an objective function of an evaluation model can be expressed by the following formula (1):

$$f(x) = \frac{\mu x^2}{\mu + x^2} \quad (1)$$

In the above formula (1), f(x) represents an objective function of an evaluation model, x represents a spatial distance of feature point pairs between two patches to be matched, and μ represents a precision control parameter.

In implementations, a value of μ represents the accuracy of solving the objective function, and the smaller the value of μ is, the higher the accuracy of solving the objective function is. In other words, this indicates that more incorrect feature point pairs can be removed in a process of optimization and refinement of feature point pairs.

In implementations, a spatial distance of feature point pairs between two patches to be matched may be represented by the following formula (2):

$$x = \|P - TQ\| \quad (2)$$

In the above formula (2), P represents a set of feature points in a first patch to be processed, Q represents a set of feature points in a second patch to be processed, and T represents a transformation matrix of feature points between the first patch to be processed and the second patch to be processed, and x represents a spatial distance of matching feature point pairs between the first patch to be processed and the second patch to be processed.

In implementations, the spatial distance x can be solved using the above formulas (1) and (2) through a nonlinear least squares algorithm.

As an example, in order to find a solution faster and to have the solution to be more accurate, and the spatial distance x can also be solved using, for example, a Gauss-Newton method.

In implementations, a process of solving a spatial distance x of matching feature point pairs between a first patch to be processed and a second patch to be processed using a nonlinear least squares algorithm such as a Gauss-Newton method can be expressed as:

setting an initial value of a precision control parameter p, and calculating a spatial distance x using an evaluation model;

gradually reducing a value of the precision control parameter p, and iteratively calculating the spatial distance x using the evaluation model;

in response to obtaining a minimum value of the spatial distance x, obtaining a coordinate transformation matrix corresponding to the minimum value of the spatial distance x and feature point pairs corresponding to the spatial distance x; and setting the coordinate transformation matrix as a coordinate transformation matrix T, and the feature point pairs as effective feature point pairs.

As a specific example, using a nonlinear least squares algorithm such as a Gauss-Newton method, solving a spatial distance x based on the above formulas (1) and (2) may include:

S01: Obtain an initial value $\mu_0$ of a precision control parameter μ, calculate a spatial distance x based on the initial value $\mu_0$ of the precision control parameter using the above formulas (1) and (2), and determine a spatial coordinate transformation matrix T1 using the calculated spatial distance x.

In this operation, a spatial distance x can be obtained for effective feature point pairs between the first patch to be processed and the second patch to be processed after transforming into a unified coordinate system using the coordinate transformation matrix T1. For example, the spatial distance x includes, for example, x1, x2, x3, x4, x5.

S02: Reduce the precision control parameter to obtain a new precision parameter value $\mu_1$, and calculate the spatial distance x according to the new precision parameter value $\mu_1$ using the above formulas (1) and (2).

In this operation, when the precision control parameter is decreased, the accuracy of the calculation of the spatial distance x in the above formula (1) can be improved by controlling the parameter value $\mu_1$ with the reduced accuracy.

In implementations, when the precision control parameter is reduced from $\mu_0$ to $\mu_1$, the spatial distance x is calculated using the above formulas (1) and (2) according to the precision control parameter value $\mu_1$, and the spatial coordinate transformation matrix T2 is determined through the calculated spatial distance x.

In this operation, the effective feature point pairs between the first patch to be processed and the second patch to be processed can be transformed into a unified coordinate system using the coordinate transformation matrix T2 to obtain the spatial distance x. As an example, the spatial distance x includes, for example, x1, x3, x4.

Therefore, under the control of the precision control parameter, a feature point pair having a spatial distance value greater than a spatial distance threshold is removed when the accuracy of the control is improved by reducing the precision control parameter. The spatial distance threshold is related to the value of the precision control parameter. Based on the spatial distance threshold that is associated with the value of the precision control parameter, the smaller the value of the precision control parameter is, the more the number of feature point pairs having a spatial distance value greater than the associated spatial distance threshold are removed.

Operation S03: Gradually reduce the precision control parameter to perform iterative processing within a value range of the precision control parameter, continue to find a solution of the spatial distance x in the above formula (2) using the above formula (1) according to the reduced precision control parameter such as $\mu_n$, and obtain a coordinate transformation matrix corresponding to a minimum value of the spatial distance x as a coordinate transformation matrix Tn.

In this operation, the effective feature point pairs between the first patch to be processed and the second patch to be processed are transformed into a unified coordinate system using the coordinate transformation matrix Tn, and the spatial distance x, including x1, is obtained. x1 is a minimum value of the spatial distance x.

As an example, within the value range of the precision control parameter, when the minimum value of the spatial distance is calculated and obtained, the spatial coordinate transformation matrix Tn corresponding to the minimum value of the spatial distance x is taken as an optimal spatial coordinate transformation matrix.

In implementations, a feature point pair between the first patch to be processed and the second patch to be processed is obtained. When the spatial distance of the feature point pair satisfies the spatial distance threshold related to the value of the precision control parameter, the spatial distance of the feature point pair is considered as satisfying a proximity condition.

In other words, the optimal spatial coordinate transformation matrix can also be referred to as a transformation matrix that satisfies the proximity condition.

In implementations, gradual reduction of the precision control parameter can be implemented in a variety of manners. For example, the precision control parameter may be gradually reduced based on a fixed precision control parameter operation value. Alternatively, based on preset values of the precision control parameter the value of the precision control parameter may be calculated according to the above embodiments in a descending order of the preset values of the precision control parameter.

In implementations, the effective feature point pairs are transformed into a same coordinate system using the coordinate transformation matrix T obtained in the above embodiments, thereby realizing registration of the effective feature point pairs between the first patch to be processed and the second patch to be processed.

In implementations, the transformation matrix satisfying the proximity condition may be used to perform coordinate transformation on a set Q of feature points in the second patch to be processed through the above formula (2). In other words, the rotation matrix T in the above embodiment is used to perform a rotation operation on each sample point of the set Q of feature points based on a rotation component R, and a translation operation based on the translation component t, so that the set Q of the feature points is transformed to a viewing angle or a coordinate system that is the same as that of a set P of feature points in the first patch to be processed after the coordinate transformation. This realizes registration between the first point cloud data in the first patch to be processed and the second point cloud data in the second patch to be processed.

As an example, after the plurality of pieces of point cloud data are registered, the registered pieces of point cloud data can be overlapped by displacement in a same coordinate system to obtain a complete three-dimensional point cloud data model.

As an example, the data processing method of the embodiments of the present disclosure may be used. According to the first point cloud data shown in FIG. 1A and the second point cloud data shown in FIG. 1B, point cloud registration is performed on the first patch to be processed and the second patch to be processed to obtain a first point cloud registration result (not shown in the figure). The same method is used to perform point cloud registration on the third patch to be processed shown in FIG. 1C and the fourth patch to be processed shown in FIG. 1D to obtain a second point cloud registration result (not shown in the figure). The same method is used to perform point cloud registration on the point cloud data in the first point cloud registration result and the second point cloud registration result to obtain a point cloud data model as shown in FIG. 1E.

In the point cloud data model shown in FIG. 1E, the feature point A1 (B1) indicates that the feature point A1 and the feature point B1 coincide after the first point cloud data and the second point cloud data are registered. When the feature point A1 and the feature point B1 coincide, a spatial distance between the feature point A1 and the feature point B1 is the smallest.

In implementations, when processing the plurality of pieces of point cloud data, two pieces of point cloud data may be arbitrarily selected from the plurality of pieces of point cloud data, and processed to obtain new point cloud data. Any two pieces of point cloud data may further be selected from the new point cloud data other unregistered pieces of point cloud data in the plurality of pieces of point cloud data for performing the data processing method of the embodiments of the present disclosure, until all the pieces of point cloud data are registered, thereby obtaining a complete 3D point cloud data model as shown in FIG. 1E.

In implementations, after the optimization and the refinement of the feature point pairs in operation S130, the feature point pairs between the patches to be processed has a high accuracy and a good noise resistance. A large number of experiments have shown that a feature point matching result with a high precision and a high accuracy can be obtained through the data processing method of the embodiments of the present disclosure, when a signal-to-noise ratio of feature point matching between the patches to be processed is less than or equal to 0.7 or less than or equal to 0.4, which results in a stable and accurate 3D point cloud data model.

FIG. 2A-FIG. 2D are flowcharts of a data processing method 200 in accordance with the embodiments of the present disclosure. As shown in FIG. 2, the data processing method 200 in the embodiments of the present disclosure includes the following operations:

Operation S210: Determine feature points in first point cloud data and feature points in second point cloud data, the first point cloud data and the second point cloud data being used for representing different parts of a same object.

In implementations, operation S210 may specifically include:

Operation S211: Extract feature points that meet a selection criterion of a specified feature from the first point cloud data according to the selection criterion.

Operation S212: Extract feature points that meet the selection criteria from the second point cloud data.

Operation S220: Perform feature matching on the first point cloud data and the second point cloud data to determine feature points of the first point cloud data and the second point cloud data that meet a feature matching condition, and form a plurality of feature point pairs.

In implementations, operation S220 may specifically include:

Operation S221: Obtain a first feature point in the first point cloud data, and use a feature value of the first feature point to search for a second feature point in the second point cloud data, and a feature value of the second feature point and the feature value of the first feature point satisfying a feature value threshold condition.

Operation S222: Search for a third feature point in the first point cloud data using the feature value of the second feature point, and a feature value of the third feature point and the feature value of the second feature point satisfying the feature value threshold condition.

Operation S223: Determine that the first feature point and the second feature point are feature points that meet the feature matching condition when the first feature point and the third feature point coincide, and form a plurality of feature point pairs.

Operation S230: For one or more feature point pairs of the plurality of feature point pairs, determine a transformation matrix in which a spatial distance between feature points in the feature point pairs satisfies a proximity condition.

In implementations, operation S230 may specifically include:

Operation S231: Construct an evaluation model of the one or more feature point pairs of the plurality of feature point pairs based on the spatial distance and a precision control parameter.

Operation S232: Under the control of the precision control parameter, the spatial distance is iteratively processed using the evaluation model to obtain effective feature point pairs in the feature point pairs and a transformation matrix among the effective feature point pairs, and the transformation matrix among the effective feature point pairs is used as a transformation matrix in which the spatial distance between the feature points in the feature point pairs satisfies the proximity condition.

In implementations, operation S232 may include:

reducing the precision control parameter, using the evaluation model and the reduced precision control parameter to construct a new evaluation model; and in a process of using the new evaluation model to solve the spatial distance of the feature point pairs, continuing to perform iterative processing by reducing the precision control parameter until a value of the spatial distance is the minimum, and obtaining effective feature point pairs in the feature point pairs and a transformation matrix among the effective feature point pairs.

Through the above operation S230, the feature point pairs can be optimized and refined to remove incorrect feature point pairs due to the influence of noise, and registration of the optimized feature point pairs can improve the precision and the accuracy of the feature point matching result, thereby obtaining a stable and accurate 3D point cloud data model.

Operation S240: Perform coordinate transformation on the one or more feature point pairs of the plurality of feature point pairs using the transformation matrix to register the first point cloud data with the second point cloud data.

The first point cloud data and the second point cloud data of the object can be registered using the foregoing operations S210-S240. In order to obtain a complete three-dimensional point cloud data model, the data processing method 200 may further include:

Operation S250: Use the registered first point cloud data and the registered second point cloud data as first point cloud data, re-determine feature points in the first point cloud data until all point cloud data of an object is registered, and obtain a complete three-dimensional point cloud data model of the object.

According to the data processing method of the embodiments of the present disclosure, when a matching signal-to-noise ratio of feature points is relatively low, a relatively stable registration result can also be obtained.

A data processing apparatus of the embodiments of the present disclosure is described in detail in conjunction with the accompanying drawings.

Figure 3:
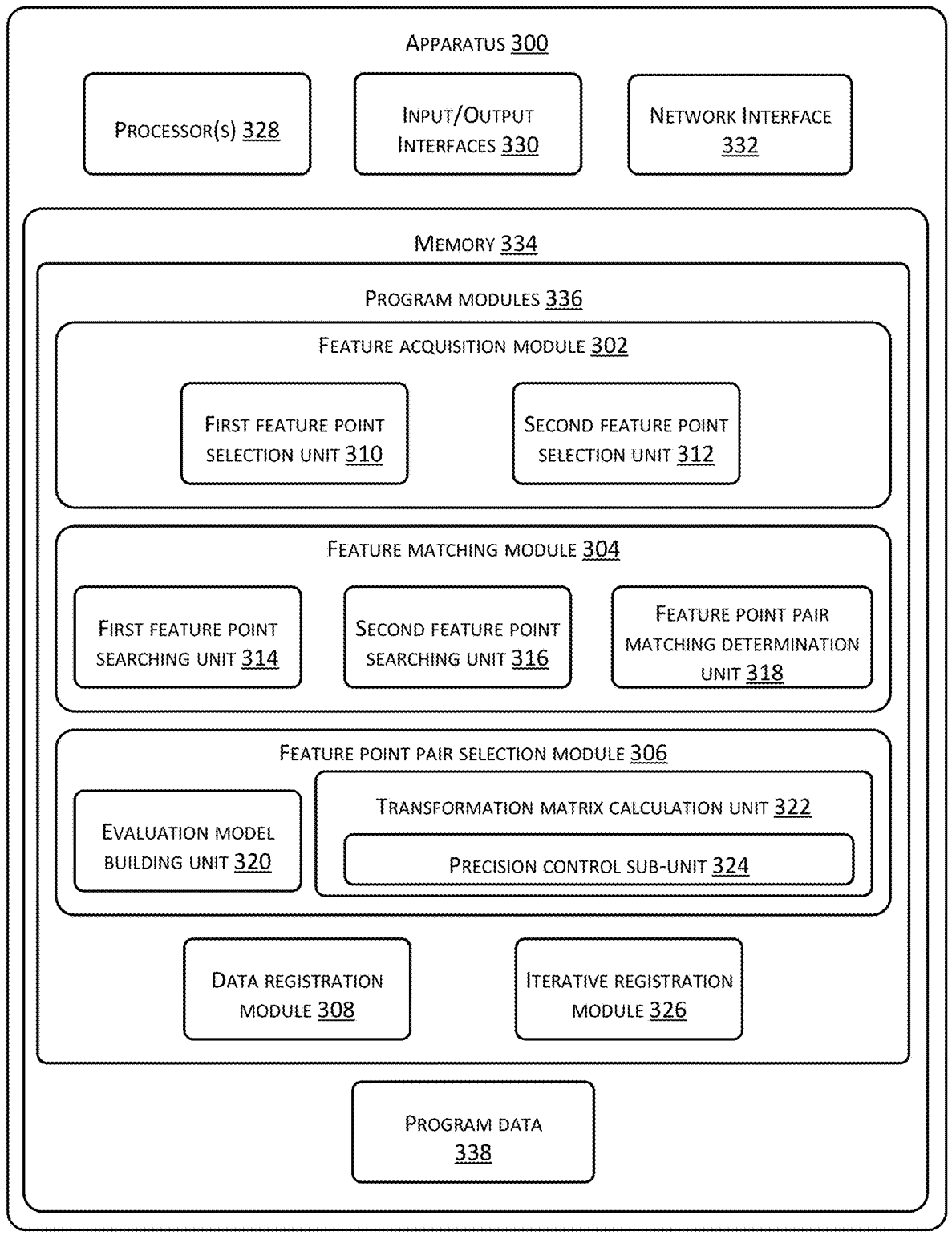
FIG. 3 is a schematic structural diagram showing a data processing apparatus in accordance with the embodiments of the present disclosure.

FIG. 3 shows a schematic structural diagram of a data processing apparatus 300 in accordance with the embodiments of the present disclosure. In implementations, the apparatus 300 may include one or more computing devices. In implementations, the apparatus 300 may be a part of one or more computing devices, e.g., implemented or run by the one or more computing devices. In implementations, the one or more computing devices may be located in a single place or distributed among a plurality of network devices over a network.

By way of example and not limitation, as shown in FIG. 3, the data processing apparatus 300 may include a feature acquisition module 302 used for determining feature points in first point cloud data and feature points in second point cloud data, the first point cloud data and the second point cloud data being used for representing different parts of a same object; a feature matching module 304 used for performing feature matching between the first point cloud data and the second point cloud data to determine feature points that satisfy a feature matching condition between the first point cloud data and the second point cloud data, and form a plurality of feature point pairs; a feature point pair selection module 306 used for determining a transformation matrix in which spatial distances between feature points in one or more feature point pairs of the plurality of feature point pairs conform to a proximity condition for the feature point pairs; and a data registration module 308 used for performing coordinate transformation on the one or more feature point pairs of the plurality of feature point pairs using the transformation matrix to register the first point cloud data with the second point cloud data.

In implementations, the feature acquisition module 302 may include a first feature point selection unit 310 configured to extract a feature point that meets a selection criterion of a specified feature from the first point cloud data according to the selection criterion; and a second feature point selection unit 312 configured to extract a feature point matching the selection criterion from the second point cloud data.

In implementations, the specified feature includes at least a geometric feature or a color feature.

In implementations, the feature matching module 304 may include a first feature point searching unit 314 configured to obtain a first feature point in the first point cloud data, and use a feature value of the first feature point to find a second feature point in the second point cloud data, a feature of the second feature point and the feature value of the first feature point satisfying a feature value threshold condition; a second feature point searching unit 316 configured to search for a third feature point in the first point cloud data using the feature value of the second feature point, a feature value of the third feature point and the feature value of the second feature point satisfying the feature value threshold condition; and a feature point pair matching determination unit 318 configured to determine the first feature point and the second feature point as feature points that meet the feature matching condition when the first feature point and the third feature point coincide, and form the plurality of feature point pairs.

In implementations, the feature point pair selection module 306 may include an evaluation model building unit 320 configured to construct an evaluation model of one or more feature point pairs of the plurality of feature point pairs based on a spatial distance and a precision control parameter; and a transformation matrix calculation unit 322 configured to iteratively process the spatial distance using the evaluation model under control of the precision control parameter to obtain effective feature point pairs in the feature point pairs and a transformation matrix among the effective feature point pairs, and treat transformation matrix between the effective feature point pairs as a transformation matrix in which the spatial distance between feature points in the feature point pairs conforms to a proximity condition.

In implementations, the transformation matrix calculation unit 322 may further include a precision control sub-unit 324 configured to reduce a value of the precision control parameter, and construct a new evaluation model using the evaluation model and the reduced precision control parameter.

The transformation matrix calculation unit 322 is further configured to find a solution for the spatial distance of the feature point pairs using the new evaluation model, and continue to reduce the precision control parameter for iterative processing until the value of the spatial distance takes a minimum, to obtain effective feature point pairs and the transformation matrix between the effective feature point pairs.

In implementations, the data processing apparatus 300 may further include an iterative registration module 326 configured to use the registered first point cloud data and the registered second point cloud data as first point cloud data to re-determine feature points in the first point cloud data until all point cloud data of an object is completed to obtain a complete 3D point cloud data model of the object.

The data processing apparatus according to the embodiments of the present disclosure perform registration for point cloud data in different viewing angles or different coordinate systems, and is able to obtain a registration result with high stability and accuracy.

Other details of the data processing apparatus according to the embodiments of the present disclosure are similar to the data processing method according to the embodiments of the present disclosure described above with reference to FIGS. 1A-1E, and are not repeatedly described herein.

In implementations, the apparatus 300 may include one or more processors 328, an input/output (I/O) interface 330, a network interface 332, and memory 334.

The memory 334 may include a form of computer readable media such as a volatile memory, a random access memory (RAM) and/or a non-volatile memory, for example, a read-only memory (ROM) or a flash RAM. The memory 334 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 334 may include program modules 336 and program data 338. The program modules 336 may include one or more of the modules, units and/or sub-units as described in the foregoing description and shown in FIG. 3.

The data processing method and apparatus according to embodiments of the present disclosure described in conjunction with FIGS. 1A-1E and 3 can be implemented by a computing device.

Figure 4:
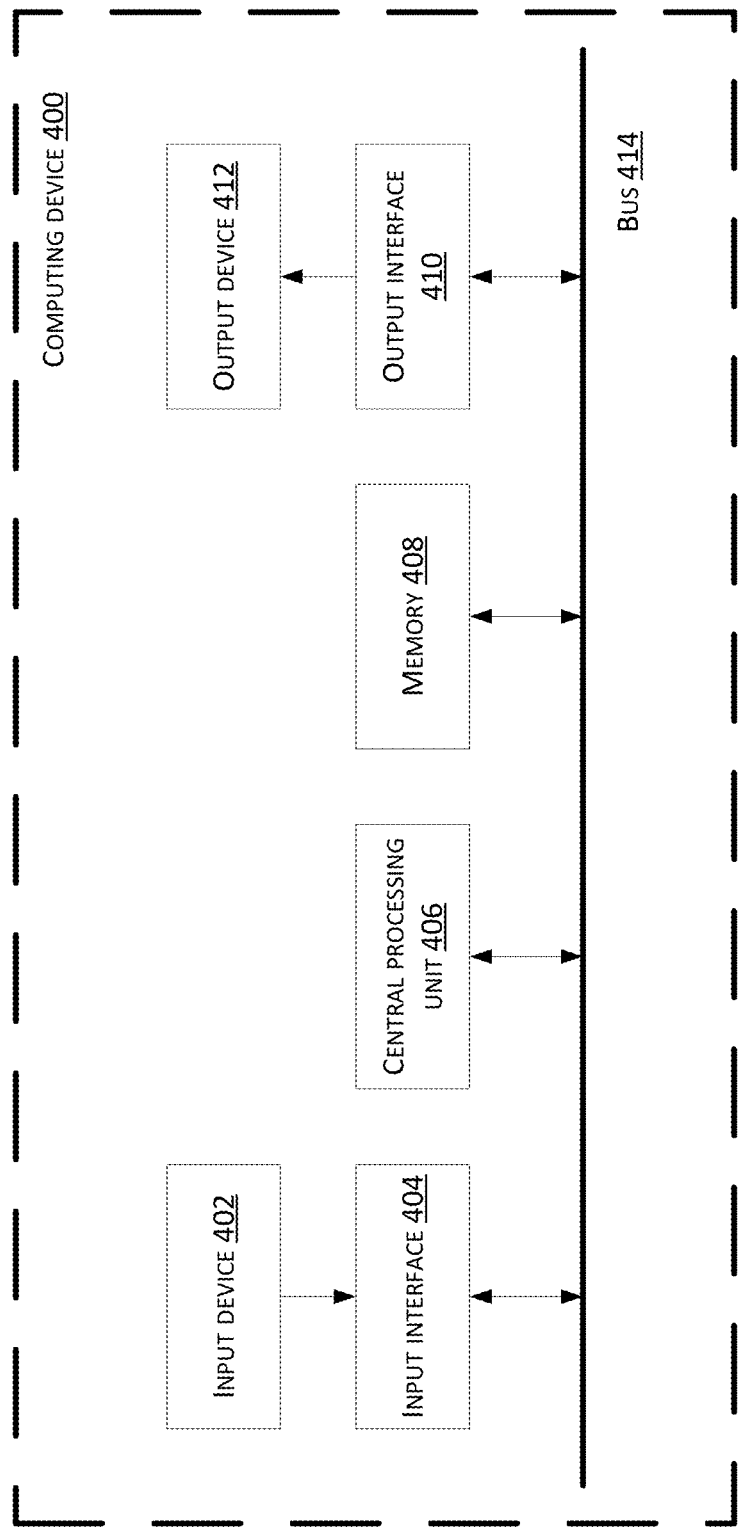
FIG. 4 is a structural diagram showing exemplary hardware architecture of a computing device that is able to implement the data processing method and apparatus in accordance with the embodiments of the present disclosure.

FIG. 4 is a block diagram showing exemplary hardware architecture of a computing device 400 capable of implementing the data processing method and apparatus in accordance with the embodiments of the present disclosure.

As shown in FIG. 4, the computing device 400 includes an input device 402, an input interface 404, a central processing unit 406, memory 408, an output interface 410, and an output device 412. The input interface 404, the central processing unit 406, the memory 408, and the output interface 410 are connected to each other through a bus 414.

The input device 402 and the output device 412 are connected to the bus 414 through the input interface 404 and the output interface 410 respectively, and, thereby connected to other components of the computing device 400. In particular, the input device 402 receives input information from an external source (e.g., a three-dimensional scanner) and transmits the input information to the central processing unit 406 via the input interface 404. The central processing unit 406 processes input information according to computer-executable instructions stored in the memory 408 to generate output information. The output information is temporarily or permanently stored in the memory 408. The output information is then transmitted to the output device 412 via the output interface 410. The output device 412 outputs the output information to the outside of the computing device 400 for use by a user.

In implementations, the computing device 400 as shown in FIG. 4 can be implemented as a data processing system which includes memory and processor(s), a memory configured to store executable program codes, and processor(s) configured to read the executable program codes stored in the memory to execute the data processing method of the above embodiments.

Using an imaging device of the embodiments of the present disclosure, point cloud data in different viewing angles or different coordinate systems can be registered, and a registration result with high stability and accuracy can be obtained.

The above embodiments may be implemented entirely or partially by software, hardware, firmware, or any combination thereof. When implemented in software, the above embodiments may be implemented in whole or in part in a form of a computer program product or a computer readable storage media. The computer program product or computer readable storage media includes one or more computer instructions. When the computer program instructions are loaded and executed on a computer, the processes or functions described in accordance with the embodiments of the present disclosure are generated in whole or in part. The computer can be a general purpose computer, a special purpose computer, a computer network, or other programmable devices. The computer instructions can be stored in a computer readable storage media or transferred from one computer readable storage media to another computer readable storage media. For example, the computer instructions can be transmitted from a website site, computer, server or data center to another website site, computer, server or data center by wired (e.g., coaxial cable, fiber optic, digital subscriber line (DSL), or wireless (e.g., infrared, wireless, microwave, etc.) means. The computer readable storage media can be any usable media that can be accessed by a computer or a data storage device such as a server, data center, or the like that includes one or more usable media. The usable media may be a magnetic media, such as a floppy disk, a hard disk, a magnetic tape, an optical media such as a DVD, or a semiconductor media such as a Solid State Disk (SSD).

It needs to be noted that the present disclosure is not limited to the specific configurations and processes described in the foregoing text and illustrated in the drawings. For the sake of brevity, a detailed description of known methods is omitted herein. In the above embodiments, a number of specific operations have been described and illustrated as examples. However, the methods of the present disclosure are not limited to the specific operations that are described and illustrated. One skilled in the art can make various changes, modifications and additions, or change an order between the operations after understanding the spirit of the present disclosure.

The above is only specific embodiments of the present disclosure. One skilled in the art can clearly understand that specific working processes of the systems, modules and units described above can be referenced to corresponding processes of the foregoing method embodiments for the convenience and brevity of the description, and are not repeatedly described herein. It should be understood that the scope of the present disclosure is not limited thereto, and one skilled in the art can easily conceive any equivalent modifications or replacements within the scope of the present disclosure. These modifications or replacements should be covered within the scope of protection of the present disclosure.

The present disclosure can be further understood using the following clauses.

Clause 1: A data processing method comprising: determining feature points in first point cloud data and feature points in second point cloud data, the first point cloud data and the second point cloud data being used for representing different parts of a same object; performing feature matching between the first point cloud data and the second point cloud data to determine feature points that satisfy a feature matching condition between the first point cloud data and the second point cloud data, and form a plurality of feature point pairs; for one or more feature point pairs of the plurality of feature point pairs, determining a transformation matrix in which a spatial distance between feature points in the feature point pairs conform to a proximity condition; and performing coordinate transformation on the one or more feature point pairs of the plurality of feature point pairs using the transformation matrix to register the first point cloud data with the second point cloud data.

Clause 2: The data processing method of Clause 1, wherein determining the feature points in the first point cloud data and the feature points in the second point cloud data comprises: extracting a feature point that meets a selection criterion of a specified feature from the first point cloud data according to the selection criterion; and extracting a feature point matching the selection criterion from the second point cloud data.

Clause 3: The data processing method of Clause 2, wherein the specified feature includes at least a geometric feature or a color feature.

Clause 4: The data processing method of Clause 1, wherein performing the feature matching between the first point cloud data and the second point cloud data to determine the feature points that satisfy the feature matching condition between the first point cloud data and the second point cloud data, and form the plurality of feature point pairs comprises: obtaining a first feature point in the first point cloud data, and using a feature value of the first feature point to find a second feature point in the second point cloud data, a feature of the second feature point and the feature value of the first feature point satisfying a feature value threshold condition; searching for a third feature point in the first point cloud data using the feature value of the second feature point, a feature value of the third feature point and the feature value of the second feature point satisfying the feature value threshold condition; and determining the first feature point and the second feature point as feature points that meet the feature matching condition when the first feature point and the third feature point coincide, and form the plurality of feature point pairs.

Clause 5: The data processing method of Clause 1, wherein: for the one or more feature point pairs of the plurality of feature point pairs, determining the transformation matrix in which the spatial distance between the feature points in the feature point pairs conform to the proximity condition comprises: constructing an evaluation model of the one or more feature point pairs of the plurality of feature point pairs based on a spatial distance and a precision control parameter; iteratively processing the spatial distance using the evaluation model under control of the precision control parameter to obtain effective feature point pairs in the feature point pairs and a transformation matrix among the effective feature point pairs, and treating transformation matrix between the effective feature point pairs as a transformation matrix in which the spatial distance between feature points in the feature point pairs conforms to the proximity condition.

Clause 6: The data processing method of Clause 5, wherein iteratively processing the spatial distance using the evaluation model under control of the precision control parameter to obtain the effective feature point pairs in the feature point pairs and the transformation matrix among the effective feature point pairs comprises: reducing a value of the precision control parameter, and constructing a new evaluation model using the evaluation model and the reduced precision control parameter; and finding a solution for the spatial distance of the feature point pairs using the new evaluation model, and continuing to reduce the precision control parameter for iterative processing until the value of the spatial distance takes a minimum, to obtain the effective feature point pairs and the transformation matrix between the effective feature point pairs.

Clause 7: The data processing method of Clause 1, further comprising using the registered first point cloud data and the registered second point cloud data as first point cloud data to re-determine feature points in the first point cloud data until all point cloud data of an object is completed to obtain a complete three-dimensional point cloud data model of the object.

Clause 8: A data processing apparatus comprising: a feature acquisition module configured to determine feature points in first point cloud data and feature points in second point cloud data, the first point cloud data and the second point cloud data being used for representing different parts of a same object; a feature matching module configured to perform feature matching between the first point cloud data and the second point cloud data to determine feature points that satisfy a feature matching condition between the first point cloud data and the second point cloud data, and form a plurality of feature point pairs; a feature point pair selection module configured to determine a transformation matrix in which spatial distances between feature points in one or more feature point pairs of the plurality of feature point pairs conform to a proximity condition for the feature point pairs; and a data registration module configured to perform coordinate transformation on the one or more feature point pairs of the plurality of feature point pairs using the transformation matrix to register the first point cloud data with the second point cloud data.

Clause 9: The data processing apparatus of Clause 8, wherein the feature acquisition module comprises: a first feature point selection unit configured to extract a feature point that meets a selection criterion of a specified feature from the first point cloud data according to the selection criterion; and a second feature point selection unit configured to extract a feature point matching the selection criterion from the second point cloud data.

Clause 10: The data processing of Clause 9, apparatus wherein the specified feature comprises at least a geometric feature or a color feature.

Clause 11: The data processing apparatus of Clause 8, wherein the feature matching module comprises: a first feature point searching unit configured to obtain a first feature point in the first point cloud data, and use a feature value of the first feature point to find a second feature point in the second point cloud data, a feature of the second feature point and the feature value of the first feature point satisfying a feature value threshold condition; a second feature point searching unit configured to search for a third feature point in the first point cloud data using the feature value of the second feature point, a feature value of the third feature point and the feature value of the second feature point satisfying the feature value threshold condition; and a feature point pair matching determination unit configured to determine the first feature point and the second feature point as feature points that meet the feature matching condition when the first feature point and the third feature point coincide, and form the plurality of feature point pairs.

Clause 12: The data processing apparatus of Clause 8, wherein the feature point pair screening module comprises: an evaluation model building unit configured to construct an evaluation model of one or more feature point pairs of the plurality of feature point pairs based on a spatial distance and a precision control parameter; and a transformation matrix calculation unit configured to iteratively process the spatial distance using the evaluation model under control of the precision control parameter to obtain effective feature point pairs in the feature point pairs and a transformation matrix among the effective feature point pairs, and treat transformation matrix between the effective feature point pairs as a transformation matrix in which the spatial distance between feature points in the feature point pairs conforms to a proximity condition.

Clause 13: The data processing apparatus of Clause 12, wherein the transformation matrix calculation unit further comprises a precision control sub-unit configured to reduce a value of the precision control parameter, and construct a new evaluation model using the evaluation model and the reduced precision control parameter, and the transformation matrix calculation unit is further configured to find a solution for the spatial distance of the feature point pairs using the new evaluation model, and continue to reduce the precision control parameter for iterative processing until the value of the spatial distance takes a minimum, to obtain effective feature point pairs and the transformation matrix between the effective feature point pairs.

Clause 14: The data processing apparatus of Clause 8, further comprising an iterative registration module configured to use the registered first point cloud data and the registered second point cloud data as first point cloud data to re-determine feature points in the first point cloud data until all point cloud data of an object is completed to obtain a complete three-dimensional point cloud data model of the object.

Clause 15: A data processing system comprising memory and a processor, the memory being configured to store executable program codes, and the processor being configured to read the executable program codes stored in the memory to execute the data processing method of any one of Clauses 1-7.

Clause 16: A computer readable storage media storing instructions, the instructions that, when run on a computer, cause the computer to execute the data processing method of any one of Clauses 1-7.

What is claimed is:

1. A method implemented by one or more computing devices, the method comprising:
   determining feature points in first point cloud data and feature points in second point cloud data, the first point cloud data and the second point cloud data being used for representing different parts of a same object;
   performing feature matching between the first point cloud data and the second point cloud data to determine feature points that satisfy a feature matching condition between the first point cloud data and the second point cloud data, and form a plurality of feature point pairs;
   for one or more feature point pairs of the plurality of feature point pairs, determining a transformation matrix in which a spatial distance between feature points in the feature point pairs conform to a proximity condition;
   performing coordinate transformation on the one or more feature point pairs of the plurality of feature point pairs using the transformation matrix to register the first point cloud data with the second point cloud data to obtain registered first point cloud data and registered second point cloud data; and
   using the registered first point cloud data and the registered second point cloud data as the first point cloud data to re-determine the feature points in the first point cloud data until a three-dimensional point cloud data model of the object is obtained.

2. The method of claim 1, wherein determining the feature points in the first point cloud data and the feature points in the second point cloud data comprises:
   extracting a feature point that meets a selection criterion of a specified feature from the first point cloud data according to the selection criterion; and
   extracting a feature point matching the selection criterion from the second point cloud data.

3. The method of claim 2, wherein the specified feature includes at least a geometric feature or a color feature.

4. The method of claim 1, wherein performing the feature matching between the first point cloud data and the second point cloud data to determine the feature points that satisfy the feature matching condition between the first point cloud data and the second point cloud data, and form the plurality of feature point pairs comprises:
   obtaining a first feature point in the first point cloud data, and using a feature value of the first feature point to find a second feature point in the second point cloud data, a feature of the second feature point and the feature value of the first feature point satisfying a feature value threshold condition;
   searching for a third feature point in the first point cloud data using the feature value of the second feature point, a feature value of the third feature point and the feature value of the second feature point satisfying the feature value threshold condition; and
   determining the first feature point and the second feature point as feature points that meet the feature matching condition when the first feature point and the third feature point coincide, and form the plurality of feature point pairs.

5. The method of claim 1, wherein: for the one or more feature point pairs of the plurality of feature point pairs, determining the transformation matrix in which the spatial distance between the feature points in the feature point pairs conform to the proximity condition comprises:
   constructing an evaluation model of the one or more feature point pairs of the plurality of feature point pairs based on a spatial distance and a precision control parameter;
   iteratively processing the spatial distance using the evaluation model under control of the precision control parameter to obtain effective feature point pairs in the feature point pairs and a transformation matrix among the effective feature point pairs, and treating transformation matrix between the effective feature point pairs as a transformation matrix in which the spatial distance between feature points in the feature point pairs conforms to the proximity condition.

6. The method of claim 5, wherein iteratively processing the spatial distance using the evaluation model under control of the precision control parameter to obtain the effective feature point pairs in the feature point pairs and the transformation matrix among the effective feature point pairs comprises:
   reducing a value of the precision control parameter, and constructing a new evaluation model using the evaluation model and the reduced precision control parameter; and
   finding a solution for the spatial distance of the feature point pairs using the new evaluation model, and continuing to reduce the precision control parameter for iterative processing until the value of the spatial distance takes a minimum, to obtain the effective feature point pairs and the transformation matrix between the effective feature point pairs.

7. An apparatus comprising:
   one or more processors;
   memory;
   a feature acquisition module stored in the memory and executable by the one or more processors to determine feature points in first point cloud data and feature points in second point cloud data, the first point cloud data and the second point cloud data being used for representing different parts of a same object;
   a feature matching module stored in the memory and executable by the one or more processors to perform feature matching between the first point cloud data and the second point cloud data to determine feature points that satisfy a feature matching condition between the first point cloud data and the second point cloud data, and form a plurality of feature point pairs;
   a feature point pair selection module stored in the memory and executable by the one or more processors to determine a transformation matrix in which spatial distances between feature points in one or more feature point pairs of the plurality of feature point pairs conform to a proximity condition for the feature point pairs;
   a data registration module stored in the memory and executable by the one or more processors to perform coordinate transformation on the one or more feature point pairs of the plurality of feature point pairs using the transformation matrix to register the first point cloud data with the second point cloud data to obtain registered first point cloud data and registered second point cloud data; and
   an iterative registration module configured to use the registered first point cloud data and the registered second point cloud data as the first point cloud data to re-determine the feature points in the first point cloud data until a three-dimensional point cloud data model of the object is obtained.

8. The apparatus of claim 7, wherein the feature acquisition module comprises:
a first feature point selection unit configured to extract a feature point that meets a selection criterion of a specified feature from the first point cloud data according to the selection criterion; and
a second feature point selection unit configured to extract a feature point matching the selection criterion from the second point cloud data.

9. The apparatus of claim 8, apparatus wherein the specified feature comprises at least a geometric feature or a color feature.

10. The apparatus of claim 7, wherein the feature matching module comprises:
a first feature point searching unit configured to obtain a first feature point in the first point cloud data, and use a feature value of the first feature point to find a second feature point in the second point cloud data, a feature of the second feature point and the feature value of the first feature point satisfying a feature value threshold condition;
a second feature point searching unit configured to search for a third feature point in the first point cloud data using the feature value of the second feature point, a feature value of the third feature point and the feature value of the second feature point satisfying the feature value threshold condition; and
a feature point pair matching determination unit configured to determine the first feature point and the second feature point as feature points that meet the feature matching condition when the first feature point and the third feature point coincide, and form the plurality of feature point pairs.

11. The apparatus of claim 7, wherein the feature point pair screening module comprises:
an evaluation model building unit configured to construct an evaluation model of one or more feature point pairs of the plurality of feature point pairs based on a spatial distance and a precision control parameter; and
a transformation matrix calculation unit configured to iteratively process the spatial distance using the evaluation model under control of the precision control parameter to obtain effective feature point pairs in the feature point pairs and a transformation matrix among the effective feature point pairs, and treat transformation matrix between the effective feature point pairs as a transformation matrix in which the spatial distance between feature points in the feature point pairs conforms to a proximity condition.

12. The apparatus of claim 11, wherein the transformation matrix calculation unit further comprises a precision control sub-unit configured to reduce a value of the precision control parameter, and construct a new evaluation model using the evaluation model and the reduced precision control parameter, and the transformation matrix calculation unit is further configured to find a solution for the spatial distance of the feature point pairs using the new evaluation model, and continue to reduce the precision control parameter for iterative processing until the value of the spatial distance takes a minimum, to obtain effective feature point pairs and the transformation matrix between the effective feature point pairs.

13. One or more computer readable media storing executable instructions that, when executed by one or more processors, cause the one or more processors to perform acts comprising:
determining feature points in first point cloud data and feature points in second point cloud data, the first point cloud data and the second point cloud data being used for representing different parts of a same object;
performing feature matching between the first point cloud data and the second point cloud data to determine feature points that satisfy a feature matching condition between the first point cloud data and the second point cloud data, and form a plurality of feature point pairs;
for one or more feature point pairs of the plurality of feature point pairs, determining a transformation matrix in which a spatial distance between feature points in the feature point pairs conform to a proximity condition;
performing coordinate transformation on the one or more feature point pairs of the plurality of feature point pairs using the transformation matrix to register the first point cloud data with the second point cloud data to obtain registered first point cloud data and registered second point cloud data; and
using the registered first point cloud data and the registered second point cloud data as the first point cloud data to re-determine the feature points in the first point cloud data until a three-dimensional point cloud data model of the object is obtained.

14. The one or more computer readable media of claim 13, wherein determining the feature points in the first point cloud data and the feature points in the second point cloud data comprises:
extracting a feature point that meets a selection criterion of a specified feature from the first point cloud data according to the selection criterion; and
extracting a feature point matching the selection criterion from the second point cloud data.

15. The one or more computer readable media of claim 13, wherein performing the feature matching between the first point cloud data and the second point cloud data to determine the feature points that satisfy the feature matching condition between the first point cloud data and the second point cloud data, and form the plurality of feature point pairs comprises:
obtaining a first feature point in the first point cloud data, and using a feature value of the first feature point to find a second feature point in the second point cloud data, a feature of the second feature point and the feature value of the first feature point satisfying a feature value threshold condition;
searching for a third feature point in the first point cloud data using the feature value of the second feature point, a feature value of the third feature point and the feature value of the second feature point satisfying the feature value threshold condition; and
determining the first feature point and the second feature point as feature points that meet the feature matching condition when the first feature point and the third feature point coincide, and form the plurality of feature point pairs.

16. The one or more computer readable media of claim 13, wherein: for the one or more feature point pairs of the plurality of feature point pairs, determining the transformation matrix in which the spatial distance between the feature points in the feature point pairs conform to the proximity condition comprises:
constructing an evaluation model of the one or more feature point pairs of the plurality of feature point pairs based on a spatial distance and a precision control parameter;

iteratively processing the spatial distance using the evaluation model under control of the precision control parameter to obtain effective feature point pairs in the feature point pairs and a transformation matrix among the effective feature point pairs, and treating transformation matrix between the effective feature point pairs as a transformation matrix in which the spatial distance between feature points in the feature point pairs conforms to the proximity condition.

17. The one or more computer readable media of claim 16, wherein iteratively processing the spatial distance using the evaluation model under control of the precision control parameter to obtain the effective feature point pairs in the feature point pairs and the transformation matrix among the effective feature point pairs comprises:

reducing a value of the precision control parameter, and constructing a new evaluation model using the evaluation model and the reduced precision control parameter; and finding a solution for the spatial distance of the feature point pairs using the new evaluation model, and continuing to reduce the precision control parameter for iterative processing until the value of the spatial distance takes a minimum, to obtain the effective feature point pairs and the transformation matrix between the effective feature point pairs.

* * * * *